US012270904B2

(12) United States Patent
Shand et al.

(10) Patent No.: US 12,270,904 B2
(45) Date of Patent: Apr. 8, 2025

(54) MAXIMUM RANGE INDICATION IN LIDAR POINT DATA

(71) Applicant: Waymo LLC, Mountain View, CA (US)

(72) Inventors: Mark Alexander Shand, Mountain View, CA (US); Ming Zou, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 1019 days.

(21) Appl. No.: 17/186,448

(22) Filed: Feb. 26, 2021

(65) Prior Publication Data

US 2021/0270967 A1 Sep. 2, 2021

Related U.S. Application Data

(60) Provisional application No. 62/983,108, filed on Feb. 28, 2020.

(51) Int. Cl.
G01S 17/10 (2020.01)
G01S 7/481 (2006.01)
G01S 7/497 (2006.01)

(52) U.S. Cl.
CPC ............ *G01S 17/10* (2013.01); *G01S 7/4817* (2013.01); *G01S 7/497* (2013.01)

(58) Field of Classification Search
CPC ........ G01S 17/10; G01S 7/4817; G01S 17/42; G01S 7/497; G01S 17/931
See application file for complete search history.

(56) References Cited

U.S. PATENT DOCUMENTS

2004/0178943 A1* 9/2004 Niv .................. G01S 13/935
342/191
2008/0192228 A1 8/2008 Eaton
(Continued)

FOREIGN PATENT DOCUMENTS

| CN | 103176173 A | 6/2013 |
| KR | 2018-0080014 | 7/2018 |
| WO | 2019/125607 A1 | 6/2019 |

OTHER PUBLICATIONS

International Searching Authoriy, International Search Report and Written Opinion mailed on Jun. 14, 2021, issued in connection with International Patent Application No. PCT/US2021/019919, filed on Feb. 26, 2021, 10 pages.

Primary Examiner — Isam A Alsomiri
Assistant Examiner — Joseph C Fritchman
(74) Attorney, Agent, or Firm — MCDONNELL BOEHNEN HULBERT & BERGHOFF LLP

(57) ABSTRACT

Computing devices, systems, and methods described in various embodiments herein may relate to light detection and ranging (LIDAR or lidar) systems. An example computing device could include a controller having at least one processor and at least one memory. The at least one processor is configured to execute program instructions stored in the at least one memory so as to carry out operations. The operations include receiving information indicative of transmit light emitted from a lidar system along a light-emission axis. The operations also include determining, based on the received information, a maximum instrumented distance. The maximum instrumented distance includes a known unobstructed region defined by a ray segment extending between the lidar system and a point along the light-emission axis.

20 Claims, 9 Drawing Sheets

(56) References Cited

U.S. PATENT DOCUMENTS

| | | |
|---|---|---|
| 2014/0063261 A1 | 3/2014 | Betensky et al. |
| 2016/0274589 A1 | 9/2016 | Templeton et al. |
| 2016/0282449 A1 | 9/2016 | Slobodyanyuk |
| 2016/0291134 A1 | 10/2016 | Droz et al. |
| 2018/0284276 A1* | 10/2018 | Campbell ............. G01S 7/4817 |
| 2018/0299554 A1 | 10/2018 | Van Dyck et al. |
| 2019/0178974 A1 | 6/2019 | Droz |
| 2020/0013215 A1* | 1/2020 | Vosoughi ............... G06T 17/005 |
| 2020/0174126 A1* | 6/2020 | Killinger .................. G01S 17/89 |
| 2020/0182978 A1* | 6/2020 | Maleki ................... G01S 17/42 |
| 2020/0363528 A1* | 11/2020 | Fischer ................... G01S 7/497 |
| 2022/0146651 A1* | 5/2022 | Liu ......................... G01S 17/89 |

\* cited by examiner

MAXIMUM RANGE INDICATION IN LIDAR POINT DATA

CROSS-REFERENCE TO RELATED APPLICATION

The present application claims the benefit of U.S. Patent Application No. 62/983,108, filed Feb. 28, 2020, the content of which is herewith incorporated by reference.

BACKGROUND

Light detection and ranging (LIDAR or lidar) systems can be utilized to determine a distance to various objects within a given environment. When lidar systems are utilized to identify potential obstacles of a vehicle, it is desirable to identify unobstructed space (e.g., an instrumented distance) within an environment of the vehicle with a high level of confidence. In the case where a lidar system emits light along a given direction but does not receive an unambiguous signal corresponding to light reflected from an occluding object, it may be unclear what the instrumented distance is along the given direction. In the absence of such a return light signal, it may be unadvisable or unsafe to conclude that the ray extending from the lidar system along the given direction is entirely unobstructed.

Accordingly, it can be beneficial to determine and maintain a dynamic database of maximum instrumented distances and/or instrumented volumes around a lidar system and/or corresponding vehicles.

SUMMARY

The present disclosure generally relates to light detection and ranging (lidar) systems and associated computing devices, which may be configured to obtain information about an environment. Such lidar systems and associated computing devices may be implemented in vehicles, such as autonomous and semi-autonomous automobiles, trucks, motorcycles, and other types of vehicles that can navigate and move within their respective environments.

In a first aspect, a computing device is provided. The computing device includes a controller having at least one processor and at least one memory. The at least one processor is configured to execute program instructions stored in the at least one memory so as to carry out operations. The operations include receiving information indicative of transmit light emitted from a lidar system along a light-emission axis. The operations also include determining, based on the received information, a maximum instrumented distance. The maximum instrumented distance includes a known unobstructed region defined by a ray segment extending between the lidar system and a point along the light-emission axis.

In a second aspect, a lidar system is provided. The lidar system includes a light-emitter device configured to emit light into an environment of the lidar system. The lidar system also includes a controller having at least one processor and at least one memory. The at least one processor is configured to execute program instructions stored in the at least one memory so as to carry out operations. The operations include causing, at a transmit time, the light-emitter device to emit transmit light along a light-emission axis. The operations also include determining a maximum instrumented distance. The maximum instrumented distance includes a known unobstructed region defined by a ray segment extending between the lidar system and a point along the light-emission axis.

In a third aspect, a vehicle is provided. The vehicle includes a lidar system. The lidar system includes a light-emitter device configured to emit light into an environment of the lidar system. The lidar system also includes a controller having at least one processor and at least one memory. The at least one processor is configured to execute program instructions stored in the at least one memory so as to carry out operations. The operations include causing, at a transmit time, the light-emitter device to emit transmit light along a light-emission axis. The operations also include determining a maximum instrumented distance. The maximum instrumented distance includes a known unobstructed region defined by a ray segment extending between the lidar system and a point along the light-emission axis.

In a fourth aspect, a method is provided. The method includes causing a light-emitter device of a lidar system to emit transmit light along a light-emission axis. The method also includes determining a maximum instrumented distance. The maximum instrumented distance includes a known unobstructed region defined by a ray segment extending between the lidar system and a point along the light-emission axis.

Other aspects, embodiments, and implementations will become apparent to those of ordinary skill in the art by reading the following detailed description, with reference where appropriate to the accompanying drawings.

DETAILED DESCRIPTION

Figure 1:
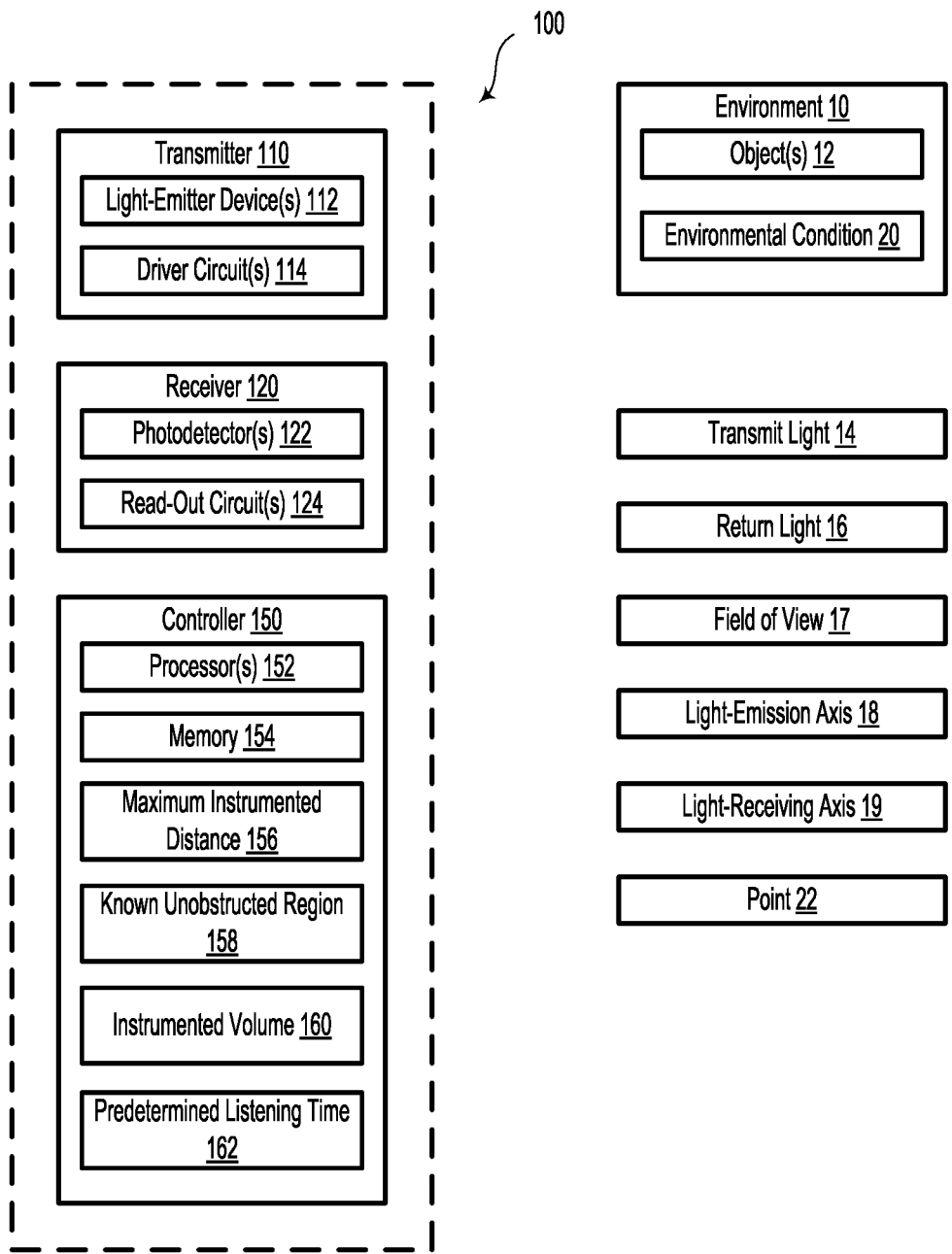
FIG. 1 illustrates a lidar system and a computing device, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Systems and methods described in various embodiments herein relate to light detection and ranging (LIDAR or lidar) systems. Such systems can be utilized to determine a distance to various objects within a given environment. In some embodiments, the systems and methods described herein could be utilized in semi- or fully-autonomous vehicles, such as with self-driving cars and trucks. Additionally or alternatively, the described embodiments could be utilized in aerial drones, boats, submarines, and/or other moving vehicles that benefit from a map of their environment.

When lidar systems are utilized to identify potential obstacles in an autonomous mode (e.g., self-driving vehicle), it is desirable to identify instances in which an instrumented space within an environment of the lidar system can be determined to be unobstructed with a high level of confidence. In the case where a lidar system emits light along a given direction but does not receive an unambiguous signal corresponding to light reflected from an occluding object, it may be unclear what the instrumented distance is along the given direction. For example, in the absence of a return light signal, it may be unadvisable or unsafe to conclude that the ray extending from the lidar system along the given direction is entirely unobstructed (e.g., to infinity or even out to a distance that corresponds to a predetermined listening time during which the lidar system could be configured to detect the reflected light signal).

Accordingly, it can be beneficial to determine and maintain dynamic information, e.g., in a database, of maximum instrumented distances and/or instrumented volumes around a lidar system and/or corresponding vehicles. Computing devices, lidar systems, vehicles, and methods described herein, and illustrated in relation to FIGS. 1, 2A, 2B, 3, 4, 5A, 5B, 5C, 5D, 5E, and 6, relate to dynamically determining a maximum instrumented distance/range and/or volume.

An example method 600 includes causing a light-emitter device (e.g., light-emitter device 112) of a lidar system (e.g., lidar system 100) to emit transmit light (e.g., transmit light 14) along a light-emission axis (e.g., light-emission axis 18). The method also includes determining a maximum instrumented distance (e.g., maximum instrumented distance 156). The maximum instrumented distance could include, for example, a known unobstructed region 158 defined by a ray segment extending between the lidar system and a point (e.g., point 22) along the light-emission axis.

In some embodiments, determining the maximum instrumented distance could be performed prior to receiving information indicative of corresponding return light or without receiving information indicative of corresponding return light. In other words, the maximum instrumented distance could be determined in lieu of receiving any return light (e.g., transmit light that has been reflected back to the lidar system from the environment).

In various embodiments, determining the maximum instrumented distance could be based in part on a predetermined listening time multiplied by one-half the speed of light.

The example method 600 could further include receiving information indicative of an environmental condition. In such scenarios, the environmental condition could include at least one of: a bright environment, a dark environment, a foggy environment, a precipitation environment, or a high interference environment. Furthermore, in such examples, determining the maximum instrumented distance could be based at least in part on the environmental condition.

In various embodiments, the transmit light could include a desired and/or actual transmit light energy. In such scenarios, determining the maximum instrumented distance could be based in part on the desired or actual transmit light energy. Additionally or alternatively, determining the maximum instrumented distance could be based in part on a radiometric calculation. Within the scope of this disclosure, various terminology can be applied to describe practical ranges of operation. For example, "absolute range" or "maximum range" could be attributed to the range at which a lidar system and/or an associated perception system can detect a bright (e.g., highly or moderately reflective) target. Such absolute ranges can be set by the time spent listening for a reflected return pulse, e.g., a default, maximum, average, median, or mode listening time. "Recall range" could be attributed to the range at which the lidar system and/or perception system has a certain percentage, e.g., ~50%, possibility of receiving a return pulse from a relatively low reflectivity object (e.g., equivalent to a ~5% Lambertian reflector). In such scenarios, the maximum instrumented distance could be equivalent to the recall range. However, in other scenarios, the maximum instrumented distance could be additionally or alternatively based on the absolute or maximum range.

In some embodiments, the lidar system may include at least one photodetector. In such examples, determining the maximum instrumented distance could be based in part on a sensitivity of the at least one photodetector. In other words, the maximum instrumented distance could be based on various performance characteristics of the at least one photodetector. For example, the known unobstructed region 158 could be defined by, at least in part, based on a responsivity of the at least one photodetector.

The example method could include receiving information indicative of return light. In such contexts, the return light could correspond to at least a portion of transmit light that has been reflected from an object. In such scenarios, determining the maximum instrumented distance could be based in part on an actual reflectivity of the object. Additionally or alternatively, determining the maximum instrumented distance could be based in part on a predicted reflectivity of the object. For example, determining the maximum instrumented distance may be based on whether the object is highly reflective (e.g., a street sign) or relatively non-reflective (e.g., a roadway, a vehicle bumper, etc.)

Various embodiments may further include storing, in at least one memory, the determined maximum instrumented distance along the light-emission axis.

In example embodiments, the transmit light may include a plurality of light pulses emitted along respective emission directions from the lidar system. In such scenarios, the method may additionally include, based on information received about the plurality of light pulses, determining an instrumented volume within an environment of the lidar system. Furthermore, the method could include storing, in at least one memory, the determined instrumented volume. Accordingly, the maximum instrumented distance values for each portion of transmit light emitted along respective light-emission axes could be updated on a dynamic basis to account for variations in weather, environmental light level, object properties, photodetector properties, predetermined or actual listening time, among other possibilities, e.g., to provide a detection capability value that remains at a certain confidence level or range.

II. Example Lidar Systems and Computing Devices

FIG. 1 illustrates a lidar system 100 and a computing device (e.g., controller 150), according to an example embodiment. In some examples, the lidar system 100 could be configured to measure distances by illuminating objects within an environment with laser light and measuring the time that reflected light takes to be received by a photodetector.

In such scenarios, the lidar system 100 includes one or more light-emitter device(s) 112 configured to emit light into an environment 10 of the lidar system 100. The lidar system 100 also includes a controller having at least one processor 152 and at least one memory 154. The at least one processor 152 is configured to execute program instructions stored in the at least one memory 154 so as to carry out various operations.

The operations could include causing, at a transmit time, the light-emitter device 112 to emit transmit light 14 along a light-emission axis 18.

The operations also include determining a maximum instrumented distance 156. The maximum instrumented distance 156 includes a known unobstructed region 158 that may be defined by a ray segment extending between the lidar system 100 and a point 22 along the light-emission axis 18. Although embodiments described herein utilize ray segments and point clouds that may be visualized as a collection of points, it will be understood that in reality the transmit light 14 has a certain divergence and as distance increases, the transmit light 14 illuminates an ever-expanding (with distance) disc centered on the central ray. In some embodiments, the transmit light 14 has interacted with something over that disc which reflected light and is then represented as point 22. In some embodiments, point 22 could represent a location at the center of such a disc. In some embodiments, the point 22 could represent a location offset from the center of such a disc. Additionally or alternatively, each beam could be represented by a cone whose apex is at the lidar system 100. In such scenarios, successive light pulses of transmit light 14 could be timed and/or spatially arranged so that neighboring cones overlap slightly. In such a fashion, substantially the entire volume around the lidar system 100 can be fully instrumented as compared to just sampling along discrete rays.

In various examples, determining the maximum instrumented distance 156 could be performed prior to receiving information indicative of corresponding return light 16 or without receiving information indicative of corresponding return light 16. That is, the maximum instrumented distance 156 could be inferred or otherwise determined without need to receive return light 16 as described herein.

As an example, determining the maximum instrumented distance 156 could be based at least in part on a predetermined listening time 162 multiplied by one-half the speed of light.

In some embodiments, the operations could additionally include receiving information indicative of an environmental condition 20. In such scenarios, the environmental condition 20 could include at least one of: a bright environment, a dark environment, a foggy environment, a precipitation environment, or a high interference environment. Other environmental conditions are possible and contemplated. In such examples, determining the maximum instrumented distance could be based at least in part on the environmental condition 20.

In various examples, the transmit light 14 could have a transmit light energy. In such scenarios, determining the maximum instrumented distance 156 is based in part on the transmit light energy. In some embodiments, determining the maximum instrumented distance could be based in part on a radiometric calculation. Such radiometric calculations could be performed to characterize the distribution of radiating power of light in space. In some embodiments, the radiometric calculations could be based on the radiant energy (e.g., in joules) of light pulses emitted by the light-emitter devices 112.

Additionally or alternatively, the lidar system 100 could include at least one photodetector 122. In such scenarios, determining the maximum instrumented distance 156 could be based in part on a sensitivity (or responsivity) of the at least one photodetector 156. In some embodiments, the responsivity of the at least one photodetector 156 could be based on the incident radiant power.

In some embodiments, the operations could additionally include receiving information indicative of return light 16. The return light 16 could correspond to at least a portion of transmit light 14 that has been reflected from an object 12. In some examples, determining the maximum instrumented distance 156 could be based in part on an actual reflectivity of the object 12.

In various examples, determining the maximum instrumented distance 156 could be based in part on a predicted reflectivity of the object 12. In some embodiments, the predicted reflectivity could be based on a determined object type of object 12. For example, if an object is determined to be another vehicle, a first predicted reflectivity may be assigned accordingly. If an object is determined to be a roadway surface, a second predicted reflectivity could be assigned. It will be understood that other object types could be assigned to objects 12 in the environment 10. Such other object types could include pedestrians, joggers/runners, animals, bicyclists, motorcyclists, curbs, walls, among other examples. For example, the maximum instrumented distance 156 could be additionally or alternatively based on a predicted reflectivity of a pedestrian who may be present or expected to be present at a known or predicted location within the environment 10. By determining the maximum instrumented distance 156 based on a known or predicted object type, lidar system 100 and/or vehicle 500 could operate in a safer, more efficient manner at least because the instrumented volume 160 around the lidar system 100 and/or vehicle 500 could dynamically take into account the different reflectance of objects in the environment 10, e.g., a crosswalk or near common exit/entrance locations like restaurant doorways or stadium entrance gates at a given time and/or on a given date. By determining the maximum instrumented distance 156 based on a known or predicted object type, lidar system 100 and/or vehicle 500 could operate in a safer, more efficient manner at least because the instrumented volume 160 around the lidar system 100 and/or vehicle 500 could dynamically take into account the different expected reflectance of objects that may be in the environment 10.

In various embodiments, the operations could additionally include storing, in the at least one memory 154, the determined maximum instrumented distance 156 along the light-emission axis 18.

In some examples, the transmit light 14 could include a plurality of light pulses that are emitted along respective emission directions from the lidar system 100. In such scenarios, the operations could also include, based on information received about the plurality of light pulses, determining an instrumented volume 160 within an environment 10 of the lidar system 100. Additionally, the operations could also include storing, in the at least one memory 154, the determined instrumented volume.

It will be understood that various other operations and functions could be possible based on the determined maximum instrumented distance 156, the known unobstructed region 158, and the instrumented volume 160. For example, knowing the maximum instrumented distance along a particular axis could determine a maximum safe velocity of an autonomous vehicle moving along the axis. Additionally or alternatively, the known unobstructed region 158 could provide a minimum scan or refresh rate for lidar information, e.g., in a given spatial sector around the lidar system 100. Other operations, such as vehicle maneuvering and/or emergency operations could be possible based on the maximum instrumented distance 156, the known unobstructed region 158, and/or the instrumented volume 160.

In some embodiments described herein, the determined maximum instrumented distance and/or the determined instrumented volume could be determined based on the total optical power received by the photodetector 122. The total optical power received at the photodetector 122 may be expressed as the following:

$$P_S = P_T \cdot \frac{\sigma}{A_{illum}} \cdot \frac{A_{rec}}{\pi R^2} \cdot \eta_{atm}^2 \cdot \eta_{sys}$$

where $P_S$ is the signal power received, $P_T$ is the power transmitted, $\sigma$ is the cross section in square meters, $A_{illum}$ is area illuminated, $A_{rec}$ is the area of the receiver, R is the range, $\eta_{atm}$ is the transmission efficiency through the atmosphere, and $\eta_{sys}$ is the receiver system optical efficiency. The power received is the power transmitted times two ratios of areas, times appropriate efficiency terms. The first ratio of areas is the cross-section divided by the illuminated area at the object plane. The second ratio of areas is the receiver aperture area divided by the effective average area illuminated by Lambertian reflection.

FIGS. 2A, 2B, 3, and 4 illustrate various operating scenarios 200, 220, 300, and 400 that relate to lidar system 100, controller 150, and methods described herein.

Figure 2A:
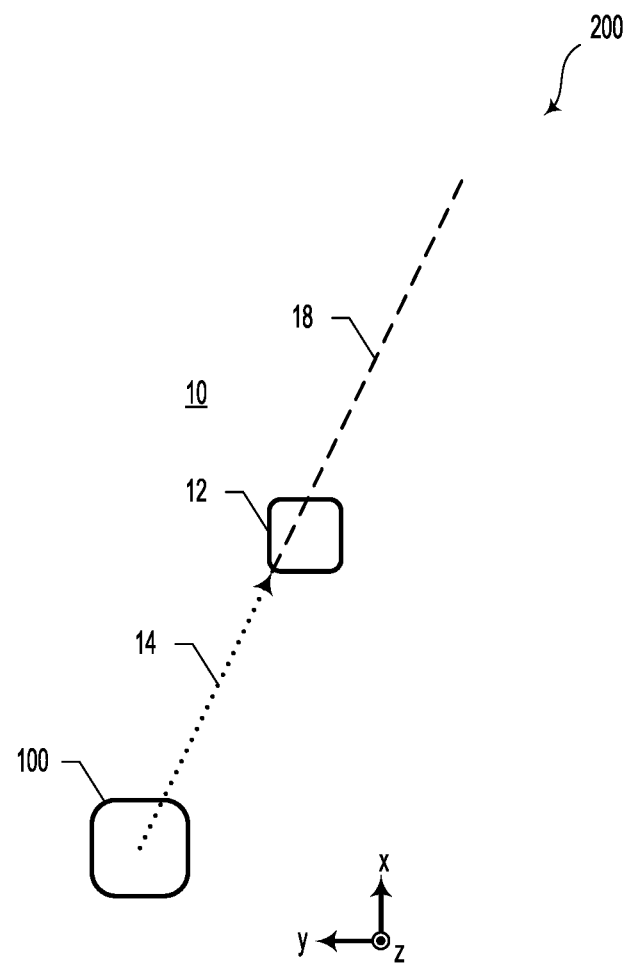
FIG. 2A illustrates an operating scenario, according to an example embodiment.
Figure 2B:
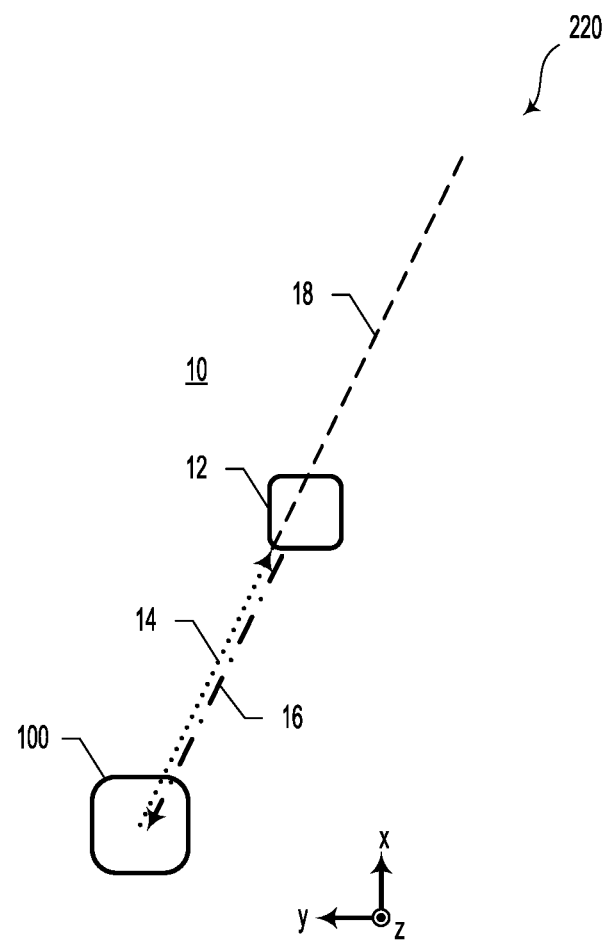
FIG. 2B illustrates an operating scenario, according to an example embodiment.

FIG. 2A illustrates an operating scenario 200 where a light-emitter of the lidar system 100 emits transmit light 14 along emission axis 18. The transmit light 14 may interact with object 12. FIG. 2B illustrates an operating scenario 220, which could represent typical operations of a conventional lidar system. Namely, at least a portion of the transmit light 14 may reflect from the object 12 to provide return light 16 that may be received by a photodetector of the lidar system 100.

Figure 3:
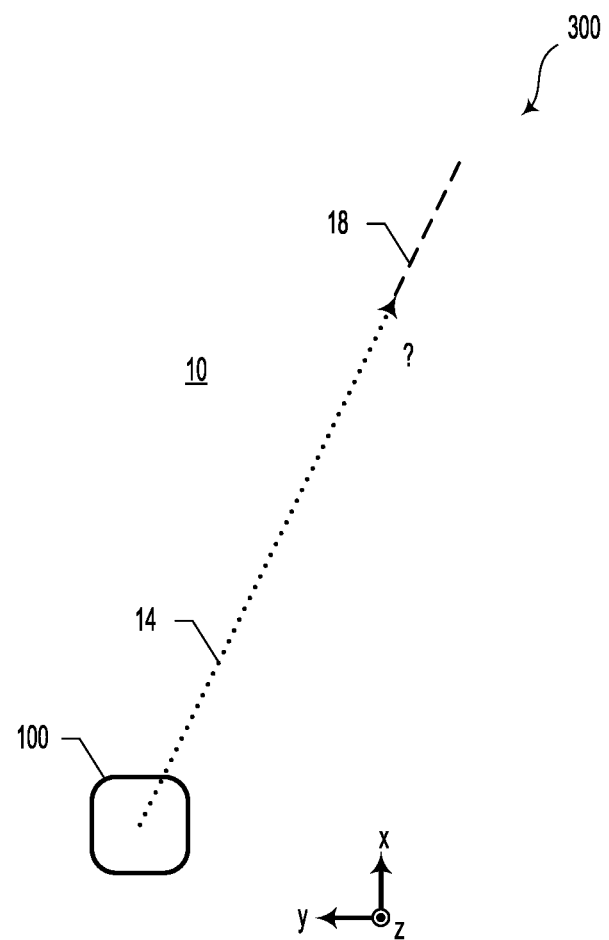
FIG. 3 illustrates an operating scenario, according to an example embodiment.

FIG. 3 illustrates an operating scenario 300 where the transmit light 14 does not interact with an object in the environment 10. Accordingly, the lidar system 100 might In such scenarios, a conventional lidar system might not be able to determine a maximum instrumented distance without return light being received by the lidar system 100. In these examples, the conventional lidar system and corresponding vehicle might operate too conservatively because a perception system might not be able to confidently determine that no objects are present along the emission axis 18 or not conservatively enough because a perception system might assume a higher confidence level than might be desirable given environmental or situational condition(s) surrounding the vehicle.

Figure 4:
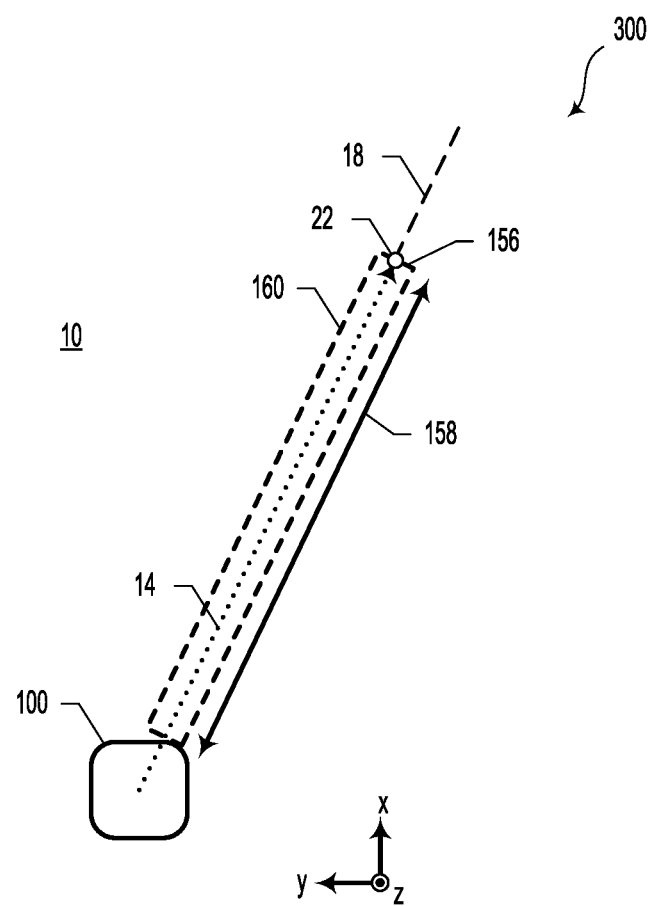
FIG. 4 illustrates an operating scenario, according to an example embodiment.
Figure 5A:
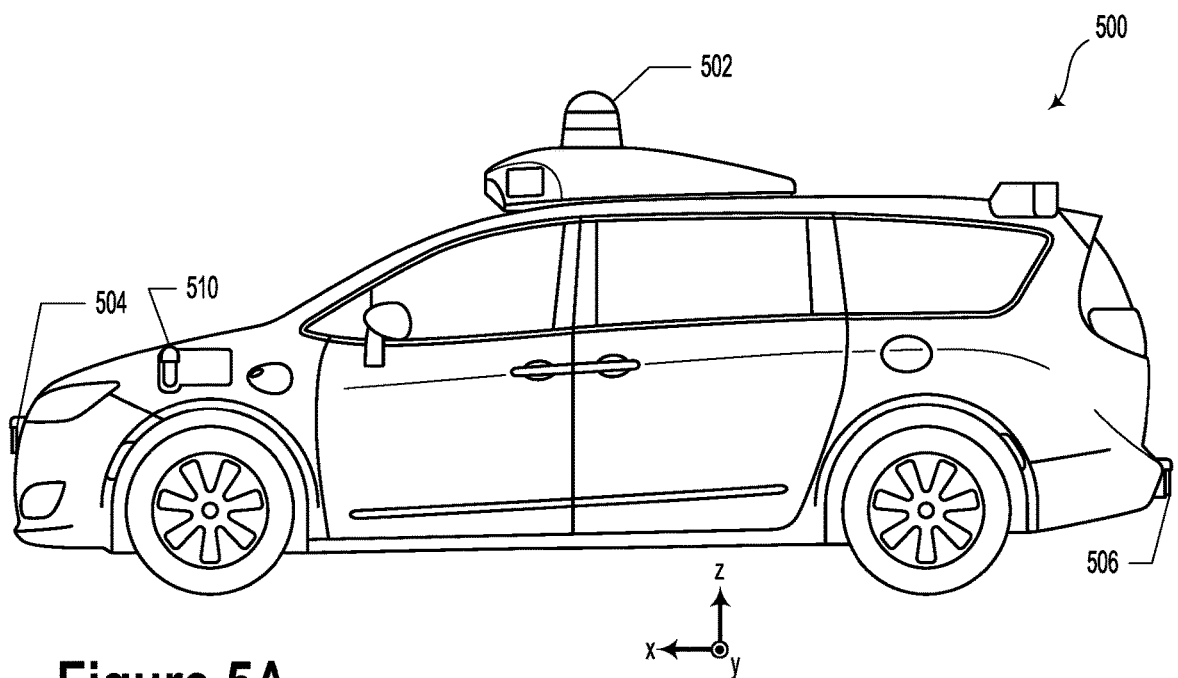
FIG. 5A illustrates a vehicle, according to an example embodiment.
Figure 5B:
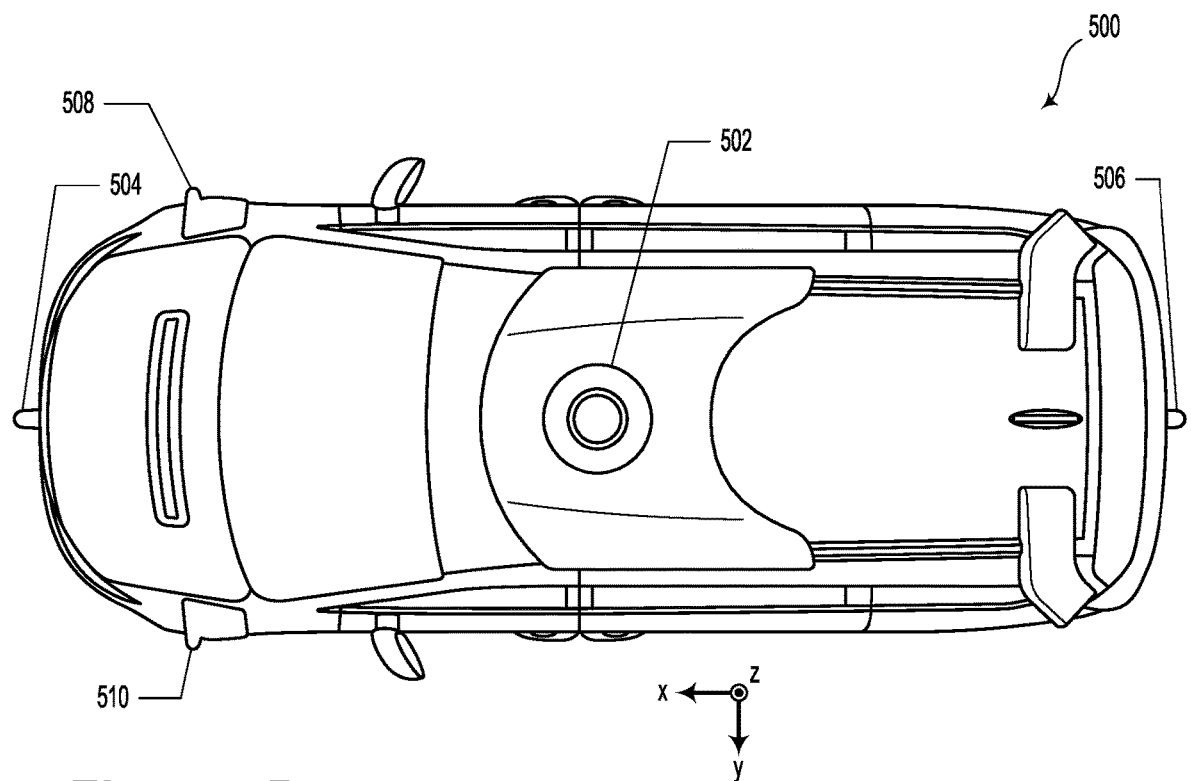
FIG. 5B illustrates a vehicle, according to an example embodiment.
Figure 5C:
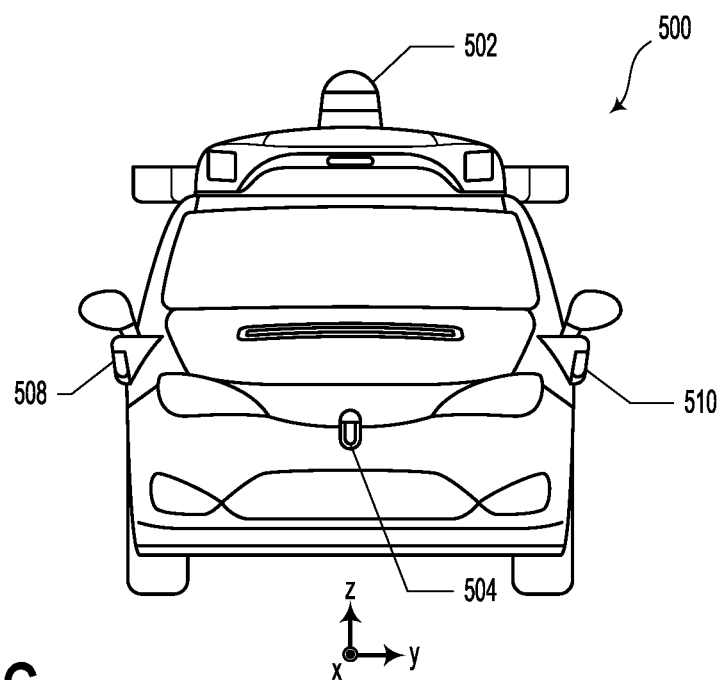
FIG. 5C illustrates a vehicle, according to an example embodiment.
Figure 5D:
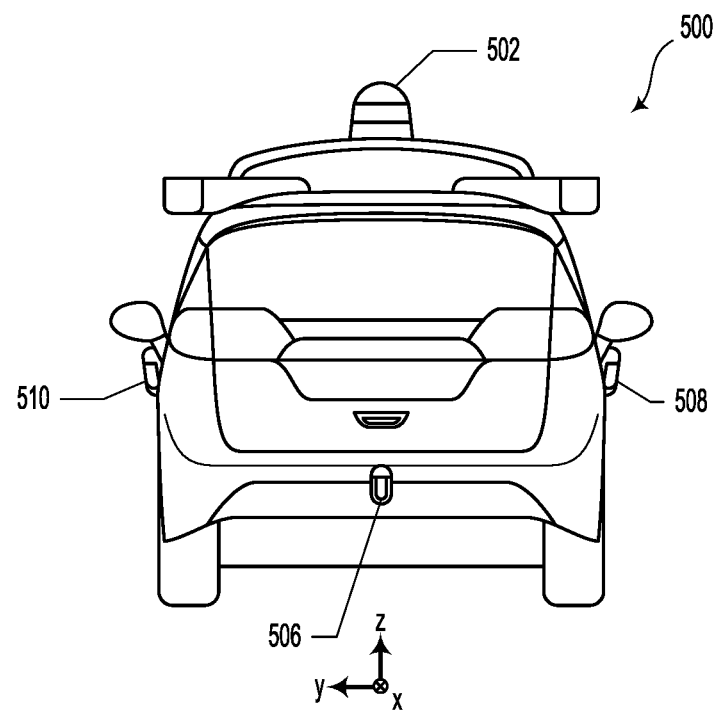
FIG. 5D illustrates a vehicle, according to an example embodiment.
Figure 5E:
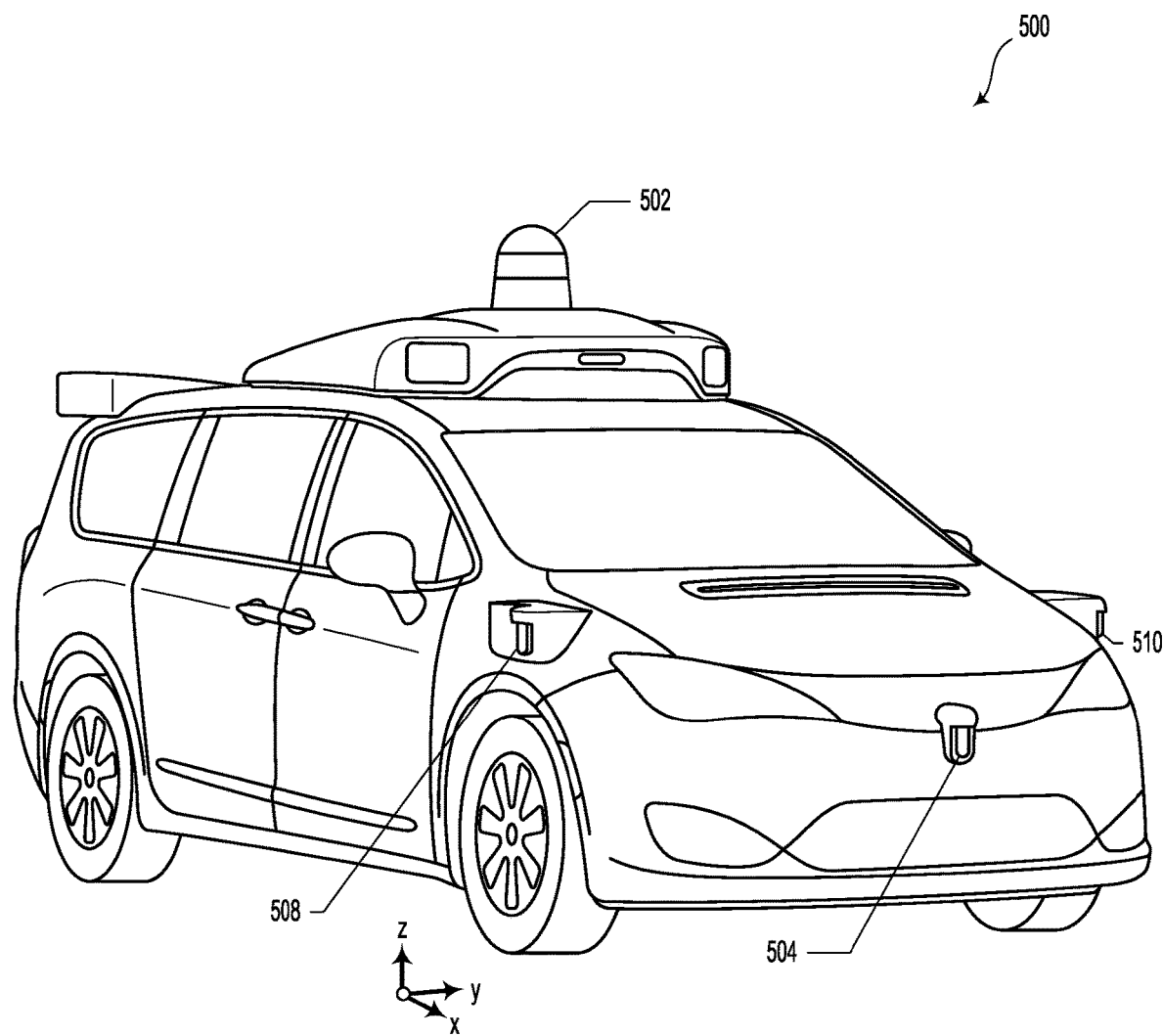
FIG. 5E illustrates a vehicle, according to an example embodiment.

FIG. 4 illustrates an operating scenario 400 where transmit light 14 is emitted by a light emitter device of the lidar system 100. In such examples, the lidar system 100 and/or controller 150 could wait for a predetermined listening time 162 after emitting the transmit light 14. The predetermined listening time 162 could define a point 22 along the light-emission axis 18. The point 22 could be a distance away from the lidar system 100 along the light-emission axis 18 that is based on one-half the speed of light times the predetermined listening time 162. If return light 16 is not received at the photodetector(s) 122 during the predetermined listening time 162, the lidar system 100 and/or the controller 150 could determine that the point 22 could represent an extent of an instrumented distance or a maximum instrumented distance 156 along the light-emission axis 18.

The lidar system 100 could emit transmit light 14 in a plurality of light-emission axes around the environment 10. In such scenarios, the plurality of determined maximum instrumented distances 156 could provide an instrumented volume 160 and/or a known unobstructed region.

III. Example Vehicles

FIGS. 5A-5E illustrate a vehicle, according to an example embodiment. In some embodiments, the vehicle 500 could be a semi- or fully-autonomous vehicle. While FIGS. 5A, 5B, 5C, 5D, and 5E illustrate vehicle 500 as being an automobile (e.g., a passenger van), it will be understood that vehicle 500 could include another type of autonomous vehicle, robot, or drone that can navigate within its environment using sensors and other information about its environment.

In some examples, the vehicle 500 may include one or more sensor systems 502, 504, 506, 508, 510, and 512. In some embodiments, sensor systems 502, 504, 506, 508, 510 and/or 512 could include lidar system 100 and/or controller 150 as illustrated and described in relation to FIGS. 1, 2A, 2B, 3, and 4. In other words, devices and systems described elsewhere herein could be coupled to the vehicle 500 and/or could be utilized in conjunction with various operations of the vehicle 500. As an example, the lidar system 100 and/or controller 150 could be utilized in self-driving or other types of navigation, planning, perception, and/or mapping operations of the vehicle 500.

In some examples, the one or more devices or systems could be disposed in various locations on the vehicle 500 and could have fields of view that correspond to internal and/or external environments of the vehicle 500.

While the one or more sensor systems 502, 504, 506, 508, 510, and 512 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

The one or more sensor systems 502, 504, 506, 508, 510, and/or 512 could include other lidar sensors. For example, the other lidar sensors could include a plurality of light-emitter devices arranged over a range of angles with respect to a given plane (e.g., the x-y plane). For example, one or more of the sensor systems 502, 504, 506, 508, 510, and/or 512 may be configured to rotate or pivot about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, 510, and/or 512 may be configured to provide respective point cloud information that may relate to physical objects within the environment of the vehicle 500. While vehicle 500 and sensor systems 502, 504, 506, 508, 510, and 512 are illustrated as including certain features, it will be understood that other types of sensor systems are contemplated within the scope of the present disclosure.

While lidar systems with single light-emitter devices are described and illustrated herein, lidar systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 5A-5E illustrate various lidar sensors attached to the vehicle 500, it will be understood that the vehicle 500 could incorporate other types of sensors.

In some embodiments, the one or more sensor systems 502, 504, 506, 508, 510, and/or 512 could include image sensors. For example, vehicle 500 could include a camera system that includes an image sensor configured to provide images of a field of view. In various examples, the image sensor may include a plurality of detector elements. In such scenarios, a perception system of the vehicle 500 could receive information from the lidar system and camera system for use with path planning, obstacle avoidance, object recognition, among other autonomous vehicle navigation functions.

Within the scope of the present disclosure, the vehicle 500 could include a lidar system (e.g., lidar system 100). The lidar system includes a light-emitter device (e.g., light-emitter device(s) 112) configured to emit light (e.g., transmit light 14) into an environment (e.g., environment 10) of the lidar system.

The lidar system includes a controller (e.g., controller 150) having at least one processor (e.g., processor(s) 152) and at least one memory (e.g., memory 154). The at least one processor is configured to execute program instructions stored in the at least one memory so as to carry out operations. The operations include causing, at a transmit time, the light-emitter device to emit transmit light along a light-emission axis (e.g., light-emission axis 18).

The operations also include determining a maximum instrumented distance (e.g., maximum instrumented distance 156). The maximum instrumented distance includes a known unobstructed region (e.g., known unobstructed region 158) defined by a ray segment extending between the lidar system and a point along the light-emission axis. In such scenarios, determining the maximum instrumented distance could be performed prior to receiving information indicative of corresponding return light and/or without receiving information indicative of corresponding return light.

In various examples, determining the maximum instrumented distance could be based in part on a predetermined listening time (e.g., predetermined listening time 162) multiplied by one-half the speed of light.

In example embodiments, the operations could also include receiving information indicative of an environmental condition, wherein the environmental condition comprises at least one of: a bright environment, a dark environment, a foggy environment, a precipitation environment, or a high interference environment. In such scenarios, determining the maximum instrumented distance could be based, at least in part, in part on the environmental condition.

The transmit light includes a transmit light energy (e.g., radiant energy measured in joules). In such scenarios, determining the maximum instrumented distance could be based at least in part on the transmit light energy. Additionally or alternatively, determining the maximum instrumented distance could be based in part on a radiometric calculation.

In some examples, the vehicle 500 could include at least one photodetector (e.g., photodetector(s) 122). In such scenarios, determining the maximum instrumented distance could be based at least in part on a sensitivity of the at least one photodetector.

In various embodiments, the operations could also include receiving information indicative of return light. The return light may correspond to at least a portion of transmit light that has been reflected from an object. In such scenarios, determining the maximum instrumented distance could be based in part on an actual reflectivity of the object. Additionally or optionally, determining the maximum instrumented distance could be based at least in part on a predicted reflectivity of the object.

In some examples, the operations could additionally include storing, in the at least one memory, the determined maximum instrumented distance along the light-emission axis. In various embodiments, the transmit light could include a plurality of light pulses emitted along respective emission directions from a lidar device (e.g., lidar system 100). In such scenarios, the operations could also include, based on information received about the plurality of light pulses, determining an instrumented volume (e.g., instrumented volume 160) within an environment of the lidar device.

In various embodiments, the operations could additionally include, storing, in the at least one memory, the determined instrumented volume. In some examples, the determined instrumented volume could include a volume defined within the environment around the vehicle 500. The determined instrumented volume could provide a dynamically-updated known region of unobstructed space around the vehicle 500.

IV. Example Methods

Figure 6:
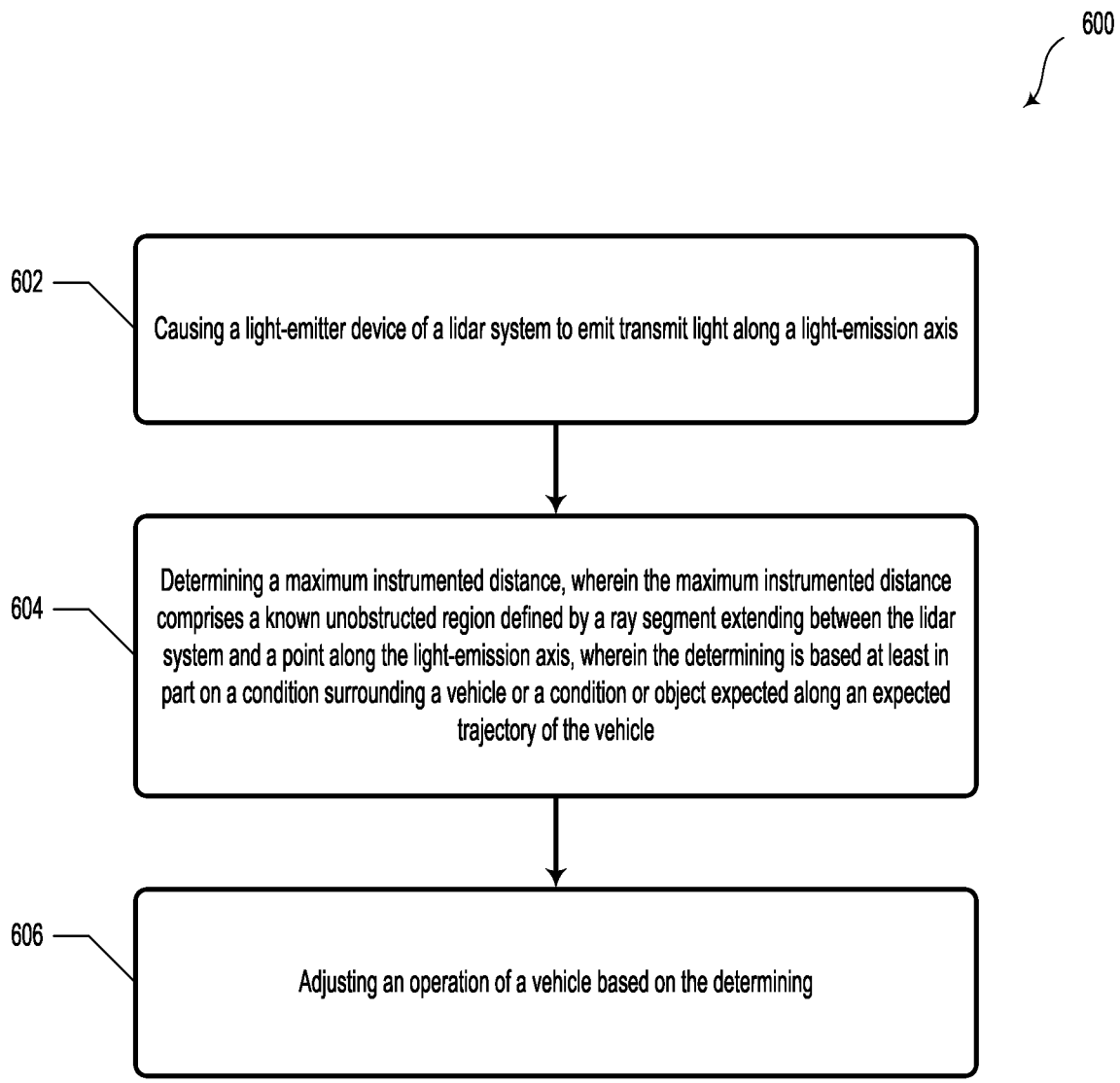
FIG. 6 illustrates a method, according to an example embodiment.

FIG. 6 illustrates a method, according to an example embodiment. While method 600 illustrates several blocks of an example method, it will be understood that fewer or more blocks or steps could be included. In such scenarios, at least some of the various blocks or steps may be carried out in a different order than of that presented herein. Furthermore, blocks or steps may be added, subtracted, transposed, and/or repeated. Some or all of the blocks or steps of method 600 may be carried out by lidar system 100, controller 150, and/or vehicle 500 as illustrated and described in reference to FIGS. 1, 2A, 2B, 3, 4, and 5A-5E.

Block 602 includes causing a light-emitter device (e.g., light-emitter device(s) 112) of a lidar system (e.g., lidar system 100) to emit transmit light (e.g., transmit light 14) along a light-emission axis (e.g., light-emission axis 18). In various examples, the transmit light could be defined by a transmit light energy. In such scenarios, determining the maximum instrumented distance could be based, at least in part, on the transmit light energy.

Block 604 includes determining a maximum instrumented distance (e.g., maximum instrumented distance 156). The maximum instrumented distance includes a known unobstructed region (e.g., known unobstructed region 158) that may be defined by a ray segment extending between the lidar system and a point along the light-emission axis. In some examples, the point along the light-emission axis could be provided by a prior light return from an object (e.g., object 12) in an environment (e.g., environment 10) of the lidar system.

In some examples, determining the maximum instrumented distance could be performed prior to receiving information indicative of corresponding return light and/or without receiving information indicative of corresponding return light. In various embodiments, determining the maximum instrumented distance could be based, at least in part, on a predetermined listening time multiplied by one-half the speed of light. As an example, the predetermined listening time could be 333 nanoseconds. Multiplying the predetermined listening time by the speed of light is approximately 100 meters. Accordingly, if return light has not been received by an elapsed time of 333 nanoseconds, the known unobstructed region along the emission axis should be at least 50 meters (e.g., one half of the distance of travel of light during the predetermined listening time). Accordingly, the maximum instrumented distance could be determined to be 50 meters. It will be understood that other maximum instrumented distances could be determined as well. For examples, factors of safety could be utilized to account for extreme or unexpected conditions. In such scenarios, utilizing factors of safety could result in shorter determined maximum instrumented distances.

In some embodiments, the determining of the maximum instrumented distance could be based at least in part on a condition surrounding a vehicle or a condition or object expected along the expected trajectory of the vehicle.

Block 606 includes adjusting an operation of the vehicle based on the determining. In other words, the vehicle's operation (e.g., speed, direction of travel, operational state, etc.) could be adjusted based on the determined maximum instrumented distance. In such scenarios, adjusting an operation of the vehicle based on the determining could include at least one of: changing a velocity of the vehicle, adjusting a minimum scan or refresh rate for lidar information in a given spatial sector around the lidar system, or alternating a trajectory or maneuver of the vehicle In some embodiments, the method 600 could additionally include receiving information indicative of an environmental condition (e.g., environmental condition 20). In such a scenario, the environmental condition could include at least one of: a bright environment, a dark environment, a foggy environment, a precipitation environment, or a high interference environment. Furthermore, determining the maximum instrumented distance could be based, at least in part, on the environmental condition.

In example embodiments, determining the maximum instrumented distance could be based in part on a radiometric calculation. For example, the maximum instrumented distance could be determined based on the total optical power equation described in Section II.

In some examples, the lidar system configured to carry out method 600 could include at least one photodetector (e.g., photodetector(s) 122). In such scenarios, determining the maximum instrumented distance could be based, at least in part, on a sensitivity of the at least one photodetector.

Method 600 may optionally include receiving information indicative of return light (e.g., return light 16). In such scenarios, the return light corresponds to at least a portion of transmit light that has been reflected from an object (e.g., object(s) 12). Additionally or alternatively, determining the maximum instrumented distance is based in part on an actual reflectivity of the object.

Optionally, in some examples, determining the maximum instrumented distance is based in part on a predicted reflectivity of the object.

Method 600 could include storing, in at least one memory (e.g., memory 154), the determined maximum instrumented distance along the light-emission axis.

In various examples, the transmit light could include a plurality of light pulses emitted along respective emission directions from the lidar system. In such scenarios, method 600 could include, based on information received about the plurality of light pulses, determining an instrumented volume (e.g., instrumented volume 160) within an environment (e.g., environment 10) of the lidar system. In such scenarios, method 600 could include storing, in at least one memory, the determined instrumented volume.

The arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A computing device comprising:
 a controller having at least one processor and at least one memory, wherein the at least one processor is configured to execute program instructions stored in the at least one memory so as to carry out operations, the operations comprising:
  receiving information indicative of transmit light emitted from a lidar system along a plurality of light-emission axes;
  determining, based on the received information, a maximum instrumented distance for each respective light-emission axis of the plurality of light-emission axes, wherein the maximum instrumented distance for each respective light-emission axis comprises a known unobstructed region defined by a ray segment extending between the lidar system and a point along the respective light-emission axis;
  receiving additional information, wherein the additional information comprises information indicative of return light, wherein the return light corresponds to at least a portion of the transmit light that has been reflected from an object; and
  determining, based on the additional information, an updated maximum instrumented distance for each respective light-emission axis of the plurality of light-emission axes.

2. The computing device of claim 1, wherein determining the maximum instrumented distance for each respective light-emission axis is performed prior to receiving the information indicative of return light.

3. The computing device of claim 1, wherein determining the maximum instrumented distance for each respective light-emission axis is based in part on a predetermined listening time multiplied by one-half the speed of light.

4. The computing device of claim 1, wherein the additional information further comprises information indicative of an environmental condition, wherein the environmental condition comprises at least one of: a bright environment, a dark environment, a foggy environment, a precipitation environment, or a high interference environment.

5. The computing device of claim 1, wherein the information indicative of the transmit light comprises a transmit light energy, wherein determining the maximum instrumented distance for each respective light-emission axis is based in part on the transmit light energy.

6. The computing device of claim 1, wherein determining the maximum instrumented distance for each respective light-emission axis is based in part on a radiometric calculation.

7. The computing device of claim 1, further comprising at least one photodetector, wherein determining the maximum instrumented distance for each respective light-emission axis is based in part on a sensitivity of the at least one photodetector.

8. The computing device of claim 1, wherein the additional information further comprises an actual reflectivity of the object.

9. The computing device of claim 1, wherein the additional information further comprises a predicted reflectivity of the object.

10. The computing device of claim 1, wherein the operations further comprise storing, in the at least one memory, the updated maximum instrumented distance for each respective light-emission axis.

11. The computing device of claim 1, wherein the operations further comprise:
 determining an instrumented volume within an environment of the lidar device based on the maximum instrumented distance for each respective light-emission axis; and
 determining an updated instrumented volume based on the updated maximum instrumented distance for each respective light-emission axis.

12. The computing device of claim 11, wherein the operations further comprise, storing, in the at least one memory, the determined instrumented volume.

13. A lidar system comprising:
 a light-emitter device configured to emit light into an environment of the lidar system; and
 a controller having at least one processor and at least one memory, wherein the at least one processor is configured to execute program instructions stored in the at least one memory so as to carry out operations, the operations comprising:
  causing the light-emitter device to emit transmit light along a plurality of light-emission axes;
  determining a maximum instrumented distance for each respective light-emission axis of the plurality of light-emission axes, wherein the maximum instrumented distance for each respective light-emission axis comprises a known unobstructed region defined by a ray segment extending between the lidar system and a point along the respective light-emission axis;
  receiving additional information, wherein the additional information comprises information indicative of return light, wherein the return light corresponds to at least a portion of the transmit light that has been reflected from an object; and
  determining, based on the additional information, an updated maximum instrumented distance for each respective light-emission axis of the plurality of light-emission axes.

14. The lidar system of claim 13, wherein determining the maximum instrumented distance for each respective light-emission axis is performed prior to receiving the information indicative of return light.

15. The lidar system of claim 13, wherein determining the maximum instrumented distance for each respective light-emission axis is based in part on a predetermined listening time multiplied by one-half the speed of light.

16. The lidar system of claim 13, wherein the additional information further comprises information indicative of an environmental condition, wherein the environmental condition comprises at least one of: a bright environment, a dark environment, a foggy environment, a precipitation environment, or a high interference environment.

17. The lidar system of claim 13, wherein the information indicative of the transmit light comprises a transmit light energy, wherein determining the maximum instrumented distance for each respective light-emission axis is based in part on the transmit light energy.

18. The lidar system of claim 13, wherein the additional information further comprises an actual reflectivity of the object.

19. The lidar system of claim 13, wherein the additional information further comprises a predicted reflectivity of the object.

20. The lidar system of claim 13, wherein the operations further comprise storing, in the at least one memory, the updated maximum instrumented distance for each respective light-emission axis.

* * * * *